(12) United States Patent
Decker et al.

(10) Patent No.: US 10,560,542 B2
(45) Date of Patent: Feb. 11, 2020

(54) MECHANISM AND METHOD FOR COMMUNICATING BETWEEN A CLIENT AND A SERVER BY ACCESSING MESSAGE DATA IN A SHARED MEMORY

(71) Applicant: GE Aviation Systems LLC, Grand Rapids, MI (US)

(72) Inventors: Christian Reynolds Decker, Melbourne, FL (US); Troy Stephen Brown, Kalamazoo, MI (US); Kevin Brett Chapman, Grand Rapids, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 1271 days.

(21) Appl. No.: 14/486,325

(22) Filed: Sep. 15, 2014

(65) Prior Publication Data
US 2016/0080517 A1 Mar. 17, 2016

(51) Int. Cl.
*H04L 29/08* (2006.01)

(52) U.S. Cl.
CPC .......... *H04L 67/2842* (2013.01); *H04L 67/12* (2013.01)

(58) Field of Classification Search
CPC .............................. H04L 67/2842; H04L 67/12
USPC ...................................................... 709/213
See application file for complete search history.

(56) References Cited

U.S. PATENT DOCUMENTS

| 6,047,391 | A | * | 4/2000 | Younis | G06F 9/546 |
| | | | | | 711/E12.099 |
| 7,454,477 | B2 | | 11/2008 | Talluri et al. | |
| 8,055,856 | B2 | * | 11/2011 | Coon | G06F 9/526 |
| | | | | | 711/147 |
| 9,098,462 | B1 | * | 8/2015 | McNicholl | G06F 13/1631 |
| 9,537,862 | B2 | | 1/2017 | Bathija et al. | |
| 9,539,155 | B2 | | 1/2017 | Johannigman et al. | |
| 2001/0003193 | A1 | * | 6/2001 | Woodring | G06F 9/544 |
| | | | | | 719/310 |
| 2002/0059503 | A1 | * | 5/2002 | Dennie | G06F 9/5016 |
| | | | | | 711/153 |
| 2002/0144010 | A1 | * | 10/2002 | Younis | G06F 9/546 |
| | | | | | 719/314 |
| 2004/0034664 | A1 | * | 2/2004 | Jain | G06F 17/30371 |

(Continued)

FOREIGN PATENT DOCUMENTS

| EP | 2743830 A1 * | 6/2014 | ............. G06F 9/542 |
| EP | 2743830 A1 * | 6/2014 | ............. G06F 9/542 |

(Continued)

OTHER PUBLICATIONS

Swenson, "A new approach to zero-copy message passing with reversible memory allocation in multi-core architectures." Proceedings of the 2012 ACM/IEEE/SCS 26th Workshop on Principles of Advanced and Distributed Simulation. IEEE Computer Society, 2012.*

(Continued)

*Primary Examiner* — Nicholas R Taylor
*Assistant Examiner* — Chong G Kim
(74) *Attorney, Agent, or Firm* — McGarry Bair, P.C.

(57) ABSTRACT

A mechanism and method for accessing message data in a shared memory by at least one client, includes an allocation of data in the shared memory, the memory configured in a plurality of buffers, and accessing the data by a client or a server without locking or restricting access to the data.

20 Claims, 7 Drawing Sheets

(56) References Cited

U.S. PATENT DOCUMENTS

| | | | |
|---|---|---|---|
| 2006/0143350 A1* | 6/2006 | Miloushev | G06F 9/5016 710/242 |
| 2006/0143525 A1* | 6/2006 | Kilian | G06F 9/505 714/31 |
| 2006/0259571 A1* | 11/2006 | Talluri | G06F 9/526 709/213 |
| 2007/0046670 A1* | 3/2007 | Hedrick | G01C 23/00 345/440 |
| 2008/0071982 A1* | 3/2008 | Kanno | G06F 3/0605 711/112 |
| 2009/0006423 A1* | 1/2009 | Crawford | H04L 49/90 |
| 2010/0199280 A1* | 8/2010 | Vestal | G06F 9/4881 718/102 |
| 2011/0202927 A1* | 8/2011 | Miloushev | G06F 9/5016 718/104 |
| 2011/0219458 A1* | 9/2011 | Labarre | H04L 12/56 726/26 |
| 2012/0137115 A1* | 5/2012 | Fiandino | G06F 17/5022 713/2 |
| 2013/0166271 A1* | 6/2013 | Danielsson | G06F 11/3664 703/22 |
| 2014/0181979 A1* | 6/2014 | Crawford | H04L 49/90 726/24 |
| 2014/0289341 A1* | 9/2014 | Occhipinti | H04L 51/18 709/206 |
| 2015/0103734 A1* | 4/2015 | Bobrek | H04B 7/18506 370/316 |
| 2015/0103825 A1* | 4/2015 | Bobrek | H04L 45/745 370/392 |
| 2015/0378936 A1* | 12/2015 | Danielsson | G06F 12/1458 711/163 |
| 2015/0381441 A1* | 12/2015 | Schalke | H04L 43/06 709/224 |
| 2016/0036513 A1* | 2/2016 | Klippert | H04W 4/001 455/15 |
| 2016/0080491 A1* | 3/2016 | Sykes | H04L 67/1097 709/219 |

FOREIGN PATENT DOCUMENTS

| | | | | |
|---|---|---|---|---|
| EP | 2784676 A1 | * | 10/2014 | .......... G06F 11/0739 |
| JP | H05-224956 A | | 9/1993 | |
| JP | H07-152640 A | | 6/1995 | |
| JP | 2004-514959 A | | 5/2004 | |
| WO | 0113229 A2 | | 2/2001 | |
| WO | 0186442 A2 | | 11/2001 | |

OTHER PUBLICATIONS

Mahajan et al., "Globalizing Selectively: Shared-Memory Efficiency With Address-Space Separation", Proceedings of The International Conference for High Performance Computing, Network, Storage and Analysis, SC13, pp. 1-12, 2013.

Great Britain Combined Search and Examination Report issued in connection with Corresponding GB Application No. 1516102.9 dated Mar. 24, 2016.

A New Approach to Zero-Copy Message Passing with Reversible Memory Allocation in Multi-core Architectures, Swenson, B.P. ; Sch. of Electr. & Comput. Eng., Georgia Inst. of Technol., Atlanta, GA, USA ; Riley, G.F. Jul. 15-19, 2012.

PkMem: A transactional, zero copy, shared memory based Mechanism for IPC., Hareesh Nagarajan, A Project Submitted in Partial Fulfillment of the Requirements for the Degree, Chicago, Illinois, Apr. 2006.

Swenson, B.P., and Riley, G.F., "A new approach to zero-copy message passing with reversible memory allocatio in multi-core architectures," 26th Workshop on Principles of Advanced and Distributed Simulation, pp. 44-52 (Jul. 15-19, 2012).

Preliminary Search Report and Opinion issued in connection with corresponding FR Application No. 1558362 dated Aug. 28, 2018 (Original Copy Unavailable).

Office Action of Japanese Patent Application 2015-173381.

\* cited by examiner

MECHANISM AND METHOD FOR COMMUNICATING BETWEEN A CLIENT AND A SERVER BY ACCESSING MESSAGE DATA IN A SHARED MEMORY

BACKGROUND OF THE INVENTION

A line-replaceable unit (LRU) is a modular component of a larger unit, such as a vehicle or aircraft, and is designed to specifications to assure they can be interchanged and/or replaced in the event of failure. LRUs of an aircraft, for example, may include entirely contained systems, sensors, radios, or other auxiliary equipment to manage and/or operate aircraft functions. In the aircraft environment, LRUs may be designed to operate according to a particular operation, interoperability, and/or form factor standards, such as those defined by ARINC series standards.

A plurality of LRUs may be interconnected by a data network to access or exchange data in a common, or shared memory, of a flight control computer or other computer system. The flight control computer or other computer system may further manage and/or operate aircraft functions.

BRIEF DESCRIPTION OF THE INVENTION

In one embodiment, a mechanism for communicating between at least one client and at least one server by accessing message data in a shared memory, includes an allocation of data in the shared memory into at least one mailslot, the allocation being accessible by a predetermined constant address, and a set of buffers for each of the at least one clients, and wherein each of the buffers is controllable by either of the respective client or the server, the at least one mailslot having references identifying the at least one client and the at least one server, the at least one client having an active access pointer that enables the at least one client to directly manipulate message data via a client-controlled buffer, the at least one server having an active access pointer that enables the at least one server to directly manipulate the message data via a server-controlled buffer. The active access pointers are allocated among buffers using only atomic operations without copying the data at an operating system level.

In another embodiment, a method for communicating between at least one client and one server by accessing message data in a shared memory, the method includes allocating data in the shared memory into at least one mailslot, assigning a single predetermined address to access each at least one mailslot, allocating a number of buffers for each of the at least one clients, each buffer being either client-controllable or server-controllable, the number of buffers being equal to the number of requested transactions by the respective client, and allocating a client active access pointer from a client-controlled buffer to change control of the client-controlled buffer to a server-controlled buffer enabling the server to directly manipulate the message data via a server active access pointer. The message data is accessed via active access pointers to the buffers without copying the message data at an operating system level.

DESCRIPTION OF EMBODIMENTS OF THE INVENTION

The described embodiments of the present invention are illustrated in the environment of aircraft having a data network interconnecting common or shared memory accessible to a plurality of sensors, systems, and components of the aircraft. However, embodiments of the invention may be implemented in any environment using clients and servers accessing common or shared memory. Furthermore, while "clients" and "servers" are described below, it will be understood that the particular embodiments described are non-limiting examples of both clients and servers. Additional examples of clients and servers may include remote (via a data network or Internet) or localized discrete units, applications, computer processes, processing threads, etc., or any combination thereof, which access a shared memory. For example, a plurality of "clients" may all reside on a single computer or computing unit, accessing common random access memory (RAM).

Figure 1:
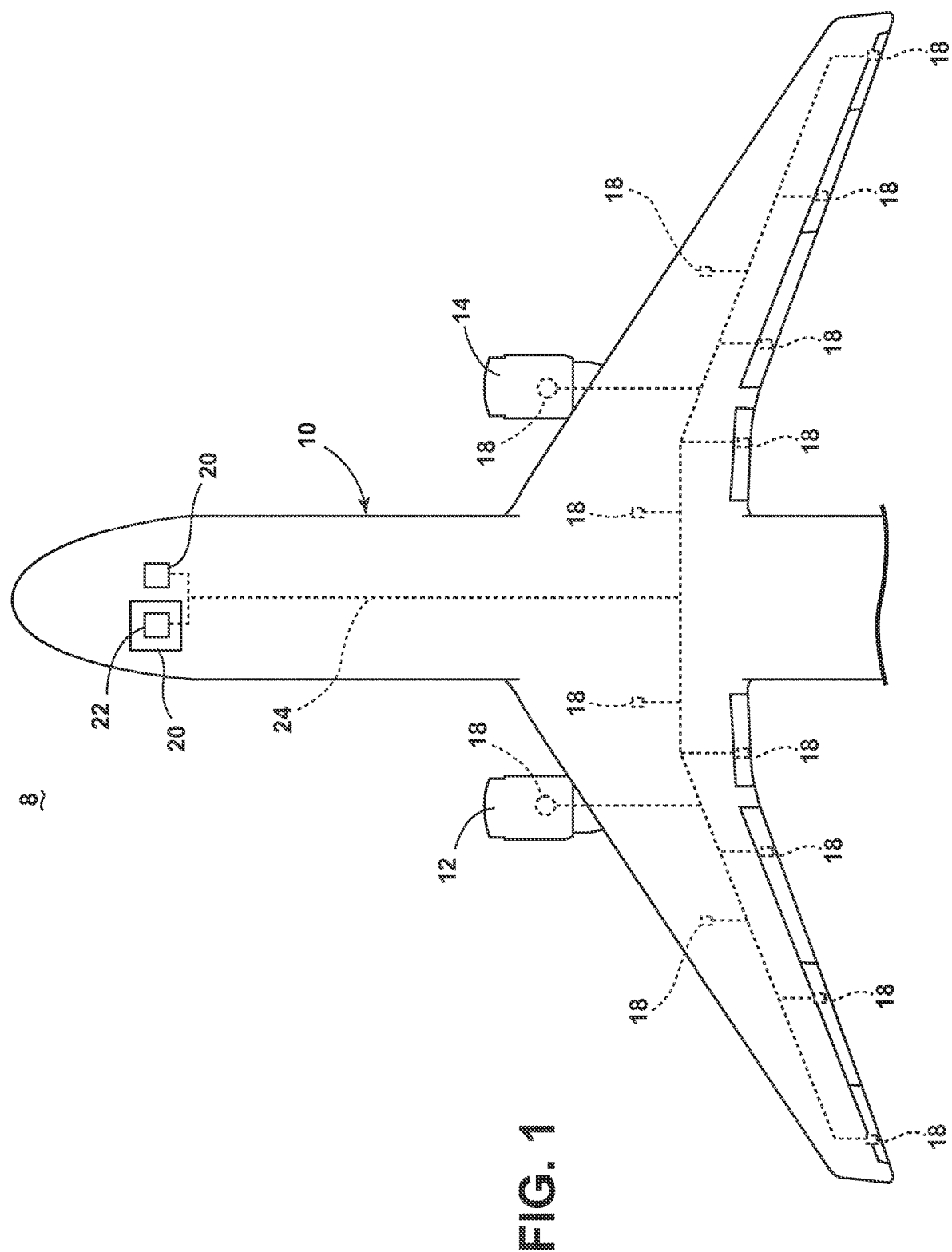
FIG. 1 is a top down schematic view of the aircraft and communications network in accordance with one embodiment of the invention.

As illustrated in FIG. 1, an aircraft 8 is shown having a fuselage 10 and at least one turbine engine, shown as a left engine system 12 and a right engine system 14. The left and right engine systems 12, 14 may be substantially identical. While turbine engines 12, 14 are illustrated, the aircraft may include fewer or additional engine systems, or alternative propulsion engine systems, such as propeller-based engines. The aircraft 8 is shown further comprising a plurality of sensors, systems, and components, collectively referred to as line-replaceable units (LRUs) 18, and at least one server 20 or computing unit, shown as two flight management systems, or flight control computers, located proximate to each other, near the nose of the aircraft 8. At least one of the servers 20 may further include memory 22. The LRUs 18 and servers 20 may be communicatively interconnected by transmission and/or communication lines defining a data communications network 24, traversing at least a portion of the aircraft 8. Examples of LRUs 18 may include flight management systems and/or onboard maintenance systems. Additional LRUs 18 may be included. While a server 20 is described, embodiments of the invention may include any computing system, flight computer, or display system displaying data from multiple systems.

The memory 22 may include random access memory (RAM), flash memory, or one or more different types of portable electronic memory, etc., or any suitable combination of these types of memory. The LRUs 18 and/or servers 20 may be operably coupled with the memory 22 such that the LRUs 18 and/or servers 20, or any computer programs or processes thereon, may access at least a portion of the memory 22 (e.g. "shared memory" 22).

As used herein, "programs" and/or "processes" may include all or a portion of a computer program having an executable instruction set for controlling the management and/or operation of at least one of the respective LRU 18, server 20, or aircraft 8 functions. The program and/or processes may include a computer program product that may include machine-readable media for carrying or having machine-executable instructions or data structures stored thereon. Such machine-readable media may be any available media, which can be accessed by a general purpose or special purpose computer or other machine with a processor. Generally, such a computer program may include routines, programs, objects, components, data structures, algorithms, etc. that have the technical effect of performing particular tasks or implement particular abstract data types. Machine-executable instructions, associated data structures, and programs represent examples of program code for executing the exchange of information as disclosed herein. Machine-executable instructions may include, for example, instructions and data, which cause a general purpose computer, special purpose computer, controller, or special purpose processing machine to perform a certain function or group of functions.

The aircraft 8 shown in FIG. 1 is merely a schematic representation of one embodiment of the invention, and used to illustrate that a plurality of LRUs 18 and servers 20 may be located throughout the aircraft 8. The exact location of the LRUs 18 and servers 20 are not germane to the embodiments of the invention. Additionally, more or fewer LRUs 18 and/or servers 20 may be included in embodiments of the invention.

The communications network 24 is illustrated as a bus, but may include a number of data communication connectors and interfaces, for example, Ethernet or fiber-optic cables, and routing and/or switching components, to facilitate the communicative interconnection between the LRUs and Servers 20. Furthermore, the configuration and operation of the communications network 24 may be defined by a common set of standards or regulations applicable to particular aircraft environments. For example, the communications network 24 on an aircraft 8 may be defined by, and/or configured according to, the ARINC 664 (A664) standard, or ARINC 653 (A653) standard, each incorporated herein by reference in its entirety.

Figure 2:
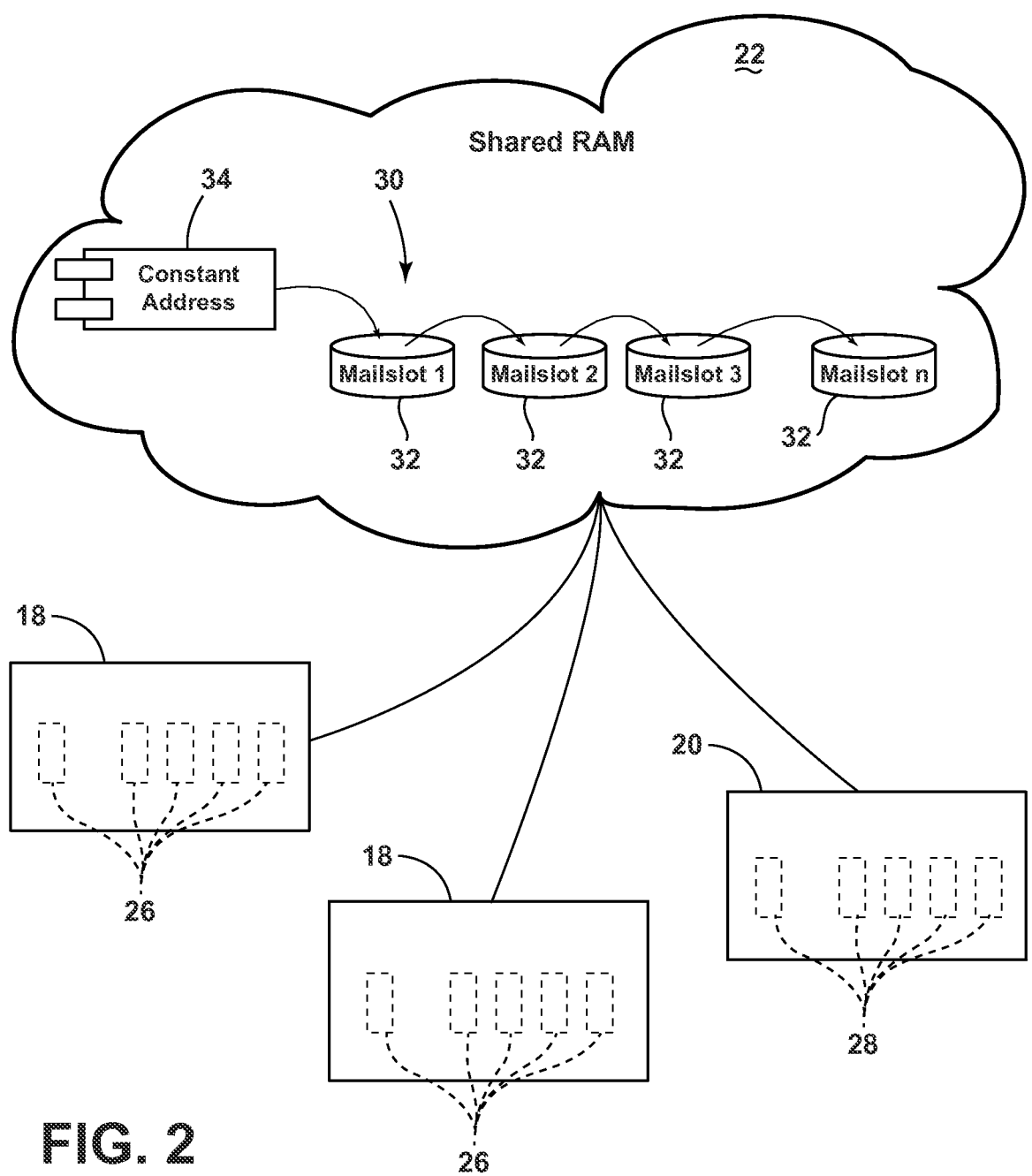
FIG. 2 is a schematic view of communication between a plurality of clients and/or servers accessing the shared memory, in accordance with one embodiment of the invention.

FIG. 2 shows a schematic illustration of a data communications system 24 in accordance with one embodiment of the invention. A plurality of LRUs 18, each including one or more threads or computer processes 26, has access to the shared memory 22, shown as shared RAM. Additionally one or more servers 20, each including one or more threads or computer processes 28, has also has access to the shared memory 22. In this sense, each process 26, 28 may have access to the shared memory 22.

The memory 22 is shown further comprising an allocation of data 30 into at least one grouping, or "mailslot" 32, positioned at a predetermined constant addressable memory location, or "constant address" 34 of the memory 22. As used herein, a "mailslot" may include a predetermined subset of memory 22 allocated for a particular utilization of data storage for the aircraft 8. For example, a single mailslot 32 may comprise a single allocation of data, such as airspeed of the aircraft 8, while another mailslot 32 may comprise a plurality of related or unrelated data elements, such as waypoints or the current flight plan. Embodiments of the invention may include configurations wherein each individual mailslot 32 uses the same message data definitions, or wherein different message data definitions are used in different mailslots 32. As shown, the mailslots 32 may be arrayed in a sequential fashion originating from the constant address 34, such as a singly-linked list; however, additional organization structures of the mailslots 32 may be configured to include matrices, variable allocations for each mailslot 32, etc., all originating from the constant address 34 location.

Each of the processes 26, 28, and/or respectively, the LRUs 18 and servers 20 are preconfigured to include the predetermined constant address 34 of the shared memory 22. In this sense, each process 26, 28, LRU 18, and/or server 20 is preconfigured to identify the location of the constant address 34, and consequently, the one or more mailslots 32 having the data to be accessed. As used herein, each LRU 18 and/or each LRU process 26 may be considered a "client" for accessing data in the shared memory 22, and each server 20 and/or each server process 28 may be considered a "server" for accessing data in the shared memory 22. Additional embodiments may be included wherein servers 20 perform actions or functions similar to clients, and clients perform actions or functions similar to servers 20. In this sense, "clients" and "servers" may perform interchangeable functions, unless otherwise noted. Additionally, while the server 20 and LRUs 18 are illustrated as separate components, embodiments of the invention may include servers 20 or clients that reside on the same systems as each other, and/or reside on the same system as the shared memory 22.

In one embodiment of the invention, the number of mailslots 32 in the shared memory 22 is predefined during the initialization of the memory 22, based on a known number of mailslots 32 accessible to the clients and/or servers. In another embodiment of the invention, the number of mailslots 32 is defined at or during runtime by the collective number of mailslots 32 accessible by the clients and/or servers. In this sense, the number of mailslots 32 may be dynamic, increasing and decreasing as needed, or only additive when additional mailslots 32 need to be accessed.

Figure 3:
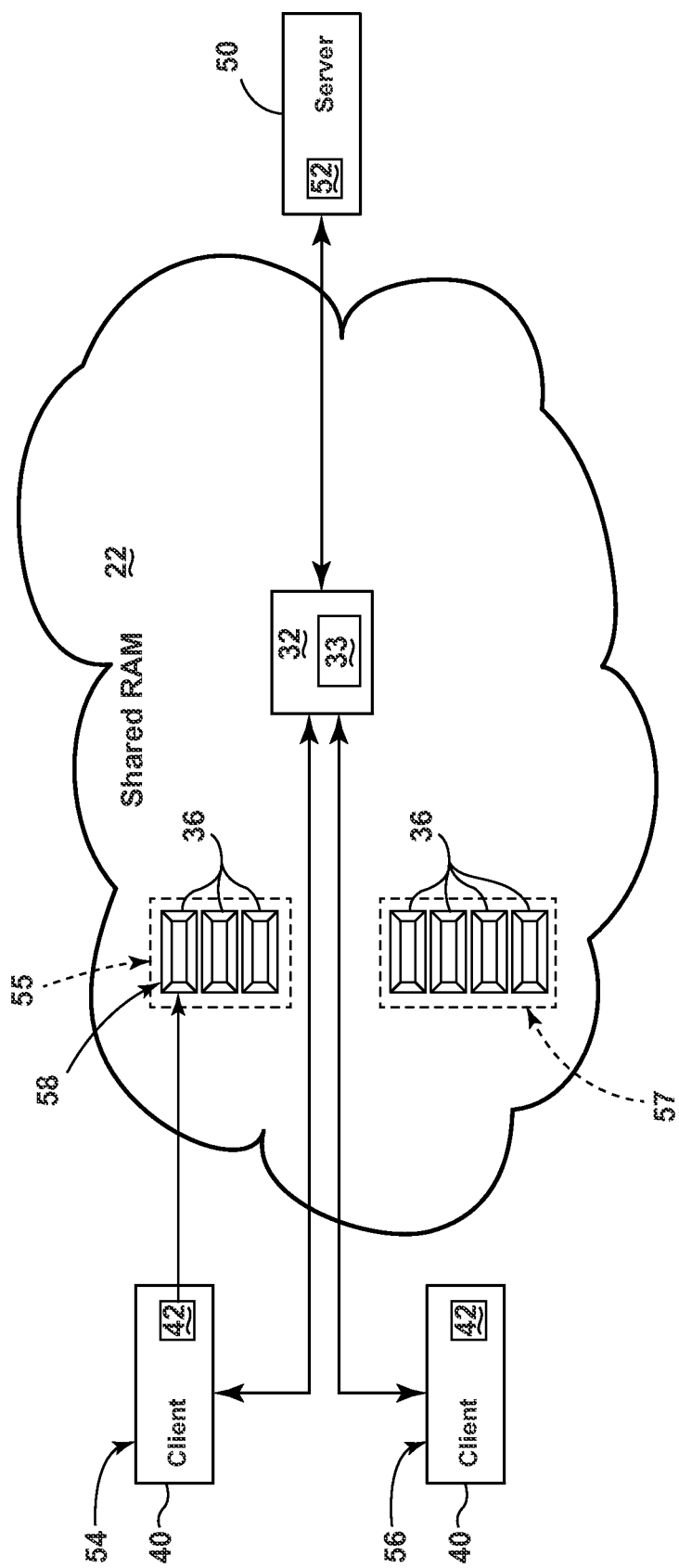
FIG. 3 is a schematic view of clients accessing the buffers of a mailslot, in accordance with one embodiment of the invention.

Turning now to FIG. 3, the shared memory 22 may be in communication with a number of clients 40 and servers 50. Each mailslot 32 of the shared memory 22 may further comprise a reference list 33 including a list of references to each of the one or more clients 40 and one or more servers 50 that may associate with that particular mailslot 32. The reference list 33 may include, for example, routing, source, and/or destination information associated for each of the respective clients 40 and/or servers 50, such that, for example, a client 40 or server 50 may consult the reference list 33 of the shared memory 22 to obtain at least one path of communication to the other of the respective server 50 or client 40. In this sense, the use of the constant address 34 and known mailslot 32 having the reference list 33 facilitates communication between one or more clients 40 and/or servers 50 without the need to define direct communication mechanisms between the clients 40 and/or servers 50 themselves.

As schematically shown, each of the one or more clients 40, further comprises an active access pointer 42 capable of identifying a specific addressable memory space, or plurality of memory space groupings, such as buffers, such that the client may access the one or more buffers. As shown, a first client 54 may access a first addressable memory space 55 associated with the first client 54, and including a number of buffers 36. Also shown, a second client 56 may access a second addressable memory space 57 associated with the second client 56 and including a second number of buffers 36. Each of the respective addressable memory spaces 55, 57 are identified and managed by their respective clients 54, 56 and/or their respective clients' active access pointers 42. Each of the plurality of buffers 36 may be configured to store a predetermined amount of data as needed for a particular data element. Embodiments of the invention may include configurations wherein, for example, the first client 54 can only access its own memory space 55 and/or buffers 36 associated with a particular mailslot 32, and thus cannot access, for example, the second client's 56 memory space 57. In this sense, each client 54, 56 "owns" their respective memory spaces 55, 57, even though individual control of the buffers 36 may be assigned to other components. While clients 40 may be limited in to their respective memory spaces 55, 57, servers 50 may access buffers 36 in any client's 40 memory spaces 55, 57.

The number of buffers 36 for each addressable memory space 55, 57 may be defined by the number of transactions requested by each respective client 54, 56. Optionally, the number of buffers 36 for each addressable memory space 55, 57 may be defined by the number of transactions requested by each respective client 54, 56, plus one extra buffer 36. Thus, in the illustrated example, the first client 54 has requested to perform two transactions in the shared memory 22, and has been provided three buffers 36 (two plus one extra buffer), while the second client 56 has requested to perform three transactions in the shared memory 22, and has been provided four buffers 36 (three plus one extra buffer).

In one embodiment of the invention, the number of buffers 36 in each addressable memory space 55, 57, and the size of the each buffer 36 are predefined during the initialization of the shared memory 22, based on a known number of clients 40 capable of accessing the mailslot 32, and a known number of transactions. In another embodiment of the invention, the number of buffers 36 in each addressable memory space 55, 57 are defined at or during runtime by the collective number of clients 40, then accessing the mailslot 32, and the number of transactions being requested. In this sense, the number of buffers 36 may be dynamic, increasing and decreasing as needed, or only additive when additional clients 40 are accessing the mailslot 32, or transactions are requested. In yet another embodiments of the invention, the mailslot 32 and addressable memory space 55, 57 may be configured independently. For example, the mailslot 32 may be predefined as explained, but the addressable memory space 55, 57 is dynamically configured during runtime, or vice versa. In either the predefined or dynamic examples, the number of mailslots 32 and/or configuration of the buffers 36 may be defined according to an algorithm or executable program stored in the shared memory 22.

Additionally, the one or more servers 50, each comprise an active access pointer 52, and are capable of accessing a specific buffer 36 indicated by the respective active access pointer 52. For example, a server 50 may access the reference list 33 of the mailslot 32 which may identify at least one of a client 40 and/or an addressable memory space 55, 57 associated with that client 40, and the buffers 36 therein. In the example illustrated, the first client 54 is associated with a first buffer 58. Embodiments of the invention may include only a single server 50 communicating with each mailslot 32.

Figure 4:
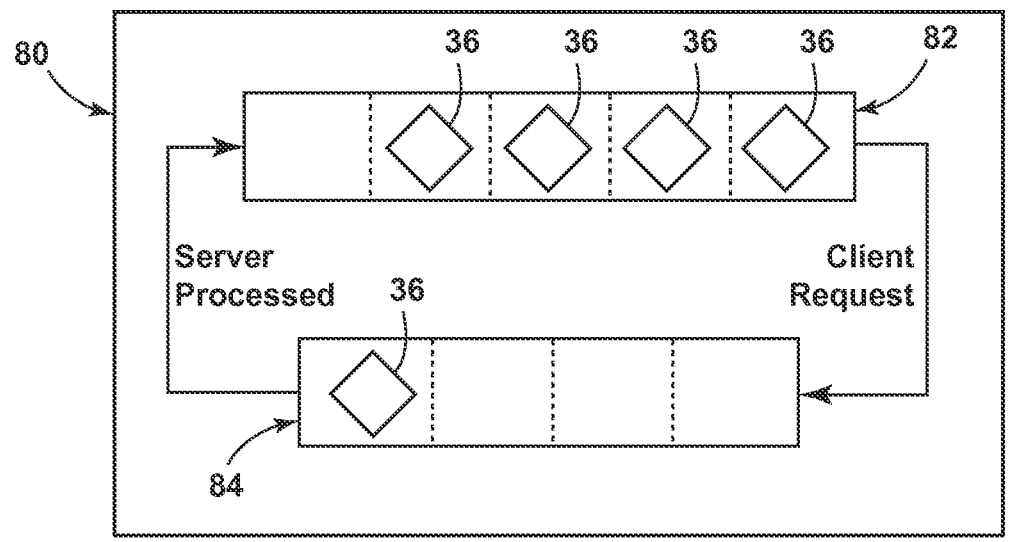
FIG. 4 is a schematic view of unidirectional and bidirectional memory spaces, in accordance with one embodiment of the invention.
Figure 4:
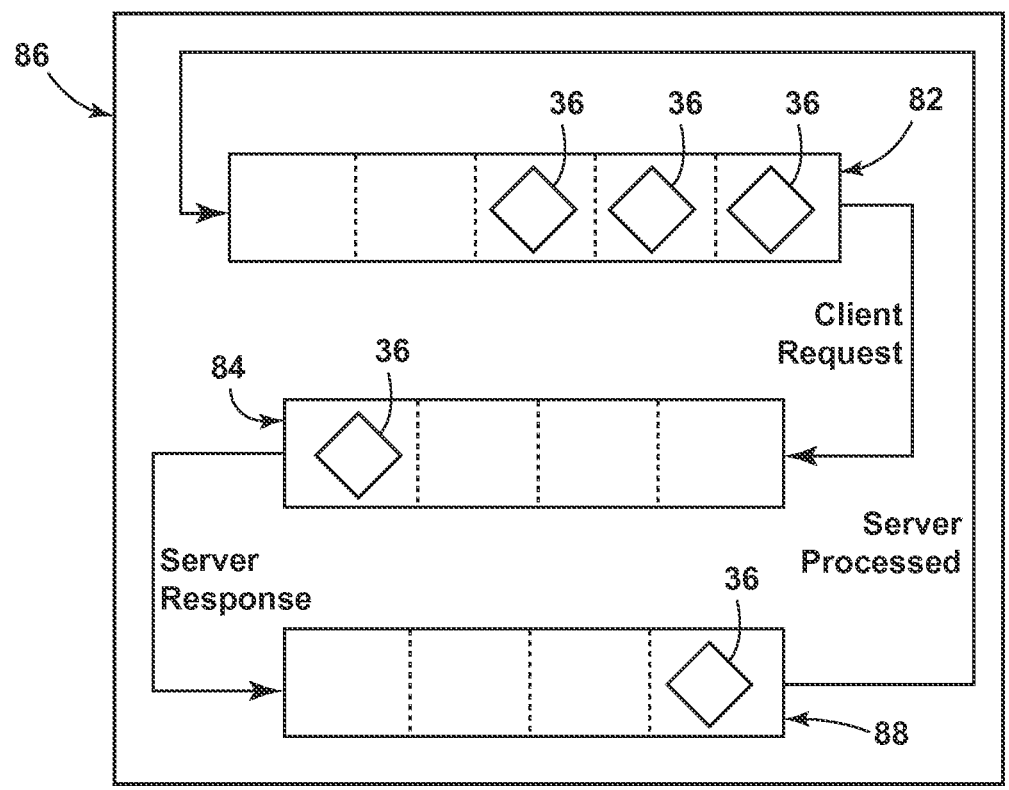

FIG. 4 further illustrates an alternative schematic view of the configuration and operation of a client's addressable memory space 55, 57. A unidirectional memory space 80 is shown comprising at least an available buffer queue 82 managed by a client 40 (not shown) and a request buffer queue 84 managed by a server 50 (not shown). The available buffer queue 82 may be configured to hold the maximum number of buffers 36 available in the memory space 80, while the request buffer queue 84 may be configured to hold the maximum number of requested buffers 36 by the client 40 (i.e. the maximum number of buffers 36 in the memory space 80, minus one). In embodiments wherein no "extra" buffers are included, the available buffer queue 82 and the request buffer queue 84 may be configured to hold the same number of buffers, equal to the number of maximum number of requested buffers 36 by the client 40.

In the illustrated example, the buffers 36 may include the data payload, or the message which is transacted upon by the respective client 40 and/or server 50. As the client 40 performs unidirectional transactions requests (that a transaction is awaiting server 50 interaction; e.g. "request pending"), a buffer 36 for each transaction request may transfer to the request buffer queue 84 for awaiting transaction or processing by a server 50. Once the server 50 performs and/or processes the requested transaction, the buffer 36 is returned to the available buffer queue 82 for the client 40 to perform further transaction requests. The client 40 may alternatively perform additional transactions and/or processing to message data of the buffer 36 when returned from the request buffer queue 84 prior to returning the buffer 36 to the available buffer queue 82. As used herein, buffers 36 allocated in the available buffer queue 82 may be considered "available" or "unoccupied" for initiating new transactions, while buffers 36 allocated in the request buffer queue 84 may be considered "unavailable" or "occupied."

Furthermore, because the request buffer queue 84 may be configured with one less available buffer 36 queue space than the available buffer queue 82, embodiments of the invention may include configurations wherein the client 40 may not perform co-pending completed transaction requests (e.g. not all buffers 36 may be simultaneously within the request buffer queue 84) on all available buffers 36 of its respective memory space 80. While the illustration shows the buffers 36 moving from one queue 82, 84, to another queue 82, 84, it is understood that the buffer 36, itself may not change location within the memory space 80. In this sense, the queues 82, 84 may be "virtual queues." The queues 82, 84 may only illustrate one embodiment of the invention demonstrating ownership of the respective buffers 36 during transaction processing in the unidirectional memory space 80.

A bidirectional memory space 86 is additionally illustrated and may comprise the available buffer queue 82 and the request buffer queue 84, as explained above, in addition to a response buffer queue 88, managed by a client 40 (not shown). The available buffer queue 82 and the request buffer queue 84 of the bidirectional memory space 86 operate similarly to the operations described above, unless otherwise noted. As shown, the response buffer queue 88 may also be configured to hold the maximum number of requested buffers 36 by the client 40 (i.e. the maximum number of buffers 36 in the memory space 80, minus one). In embodiments wherein no "extra" buffers are included, the requested buffer queue 88 may be configured to hold a number of buffers, equal to the number of maximum number of requested buffers 36 by the client 40.

One difference between the unidirectional memory space 80 and the bidirectional memory space 86 is that once the server 50 performs and/or processes the requested transaction in the request buffer queue 84, the buffer 36 is transferred to the response buffer queue 88 for some additional processing by the client 40 (transaction is awaiting client 40 interaction; e.g. "response pending"). Once the additional processing by the client 40 in the response buffer queue 88 is completed, the buffer 36 is returned to the available buffer queue 82 for the client 40 to perform further transaction requests. As used herein, buffers 36 allocated in the response buffer queue 88 may be considered "unavailable" or "occupied." The response buffer queue 88 may also be a "virtual queue," as explained above. Furthermore, embodiments of the invention may include configurations wherein the client 40 may not perform co-pending completed transaction requests on all available buffers 36 of its respective memory space 86, and thus the collective number of buffers 36 allotted between the request buffer queue 84 and response buffer queue 88 may not exceed the number of requested buffers 36 by the client 40.

In these configurations, the unidirectional memory space 80 may provide for unidirectional communication, for example, during read-only transactions, while the bidirectional memory space 86 may provide for bidirectional communication, for example, during reading and writing operations. Embodiments of the invention may include configurations wherein the client 40 may initiate the transaction, and the server 50 may respond with a corresponding transaction. Any number of unidirectional and bidirectional memory spaces 80, 86 may be included in embodiments of the invention, and defined by the transactions requested, as explained above.

Figure 5:
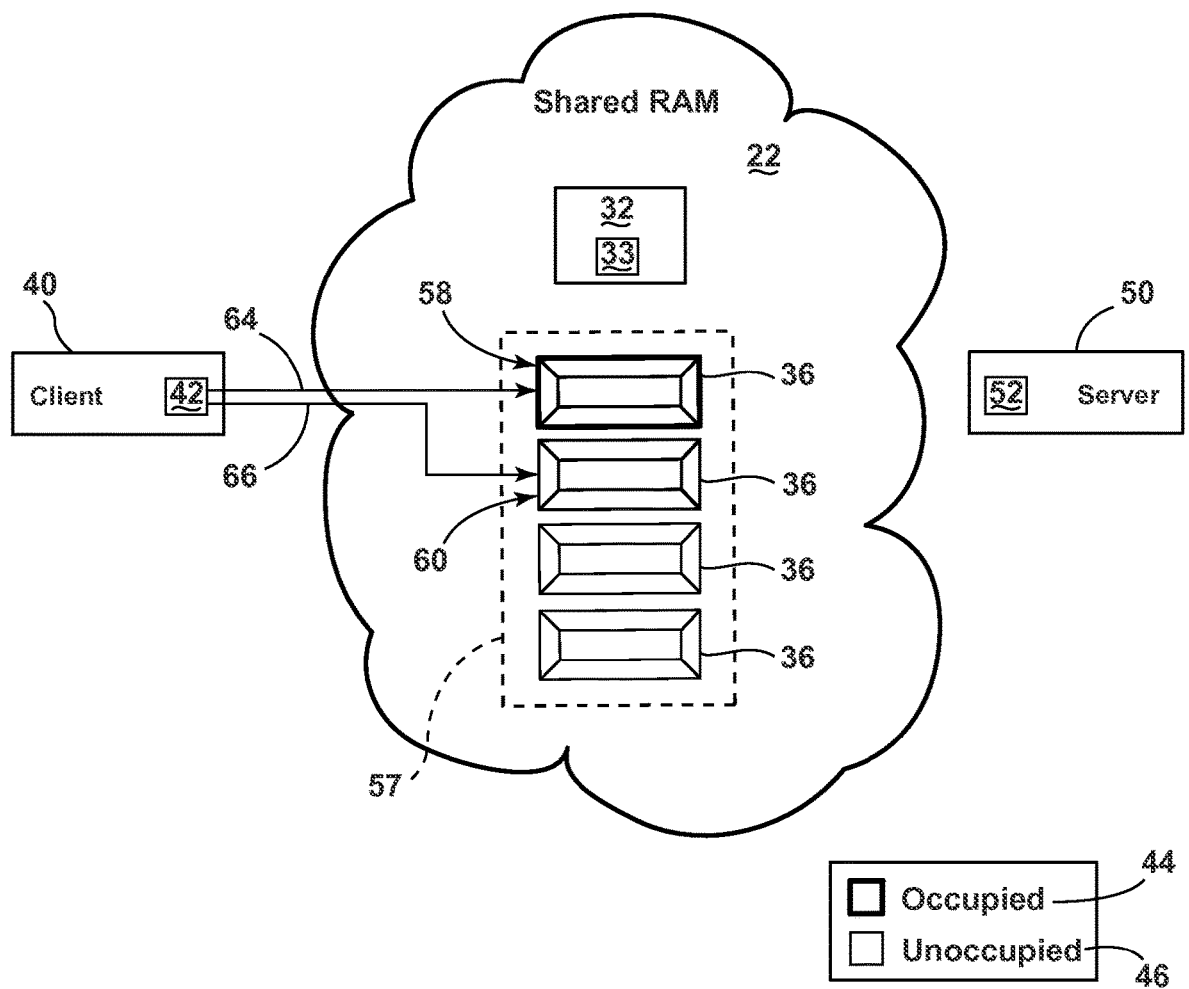
FIG. 5 is a schematic view of a mechanism for clients to access the message data in a buffer, in accordance with one embodiment of the invention.

The mechanisms for communicating between at least one client 40 and at least one server 50 by accessing message data in the buffer 36 of the shared memory 22 is described with respect to FIG. 5. In FIG. 5, only a single client 40 and corresponding addressable memory space 57 are illustrated for ease of understanding and brevity. Embodiments of the invention may include a plurality of clients 40 and respective memory spaces 57 each performing similar mechanisms. Additionally, for illustrative purposes, the plurality of buffers 36 is shown having different classification states, including occupied 44 and unoccupied 46 states. In these examples, an "occupied" 44 buffer may either client 40 "controlled" or server 50 "controlled," wherein "control" denotes the respective controller's ability to directly manipulate the message data within the buffer 36. The ownership may be controlled and/or managed by, for example, the client 40 or may be allocated and/or managed by the client's active access pointer 42. The client 40 and/or active access pointer 42 directs access to the plurality of buffers 36 based on a data transaction request.

Accordingly, a first buffer 58 has been identified as an occupied buffer 44, and is controlled by the client 40, via a first communication. When the client 40 has completed the transaction, or a portion of the transaction, with the first buffer, the client 40 may set the buffer, for example, to "request pending," to denote a transaction is required by the server 50, and cease the first communication 64. Regardless of the transaction with the server 50, if the client 40 requests a new transaction, the active access pointer 42 will manage the communication of the client 40 by identifying a second buffer 60 available for transactions, and pointing to the next available (e.g. unoccupied) buffer 36, shown as a second buffer 60. The client 40 may then communicate with the second buffer 60 via a second communication 66, and the second buffer 60 will have an occupied state 44 (not shown). The client will now perform the intended second transaction on data stored in the second buffer 60. Upon another transaction request by that same client 40, the mechanism repeats such that the incoming transaction request by the client 40 may access an unoccupied buffer 44, as identified by the client 40 and/or active access pointer 42.

Figure 6:
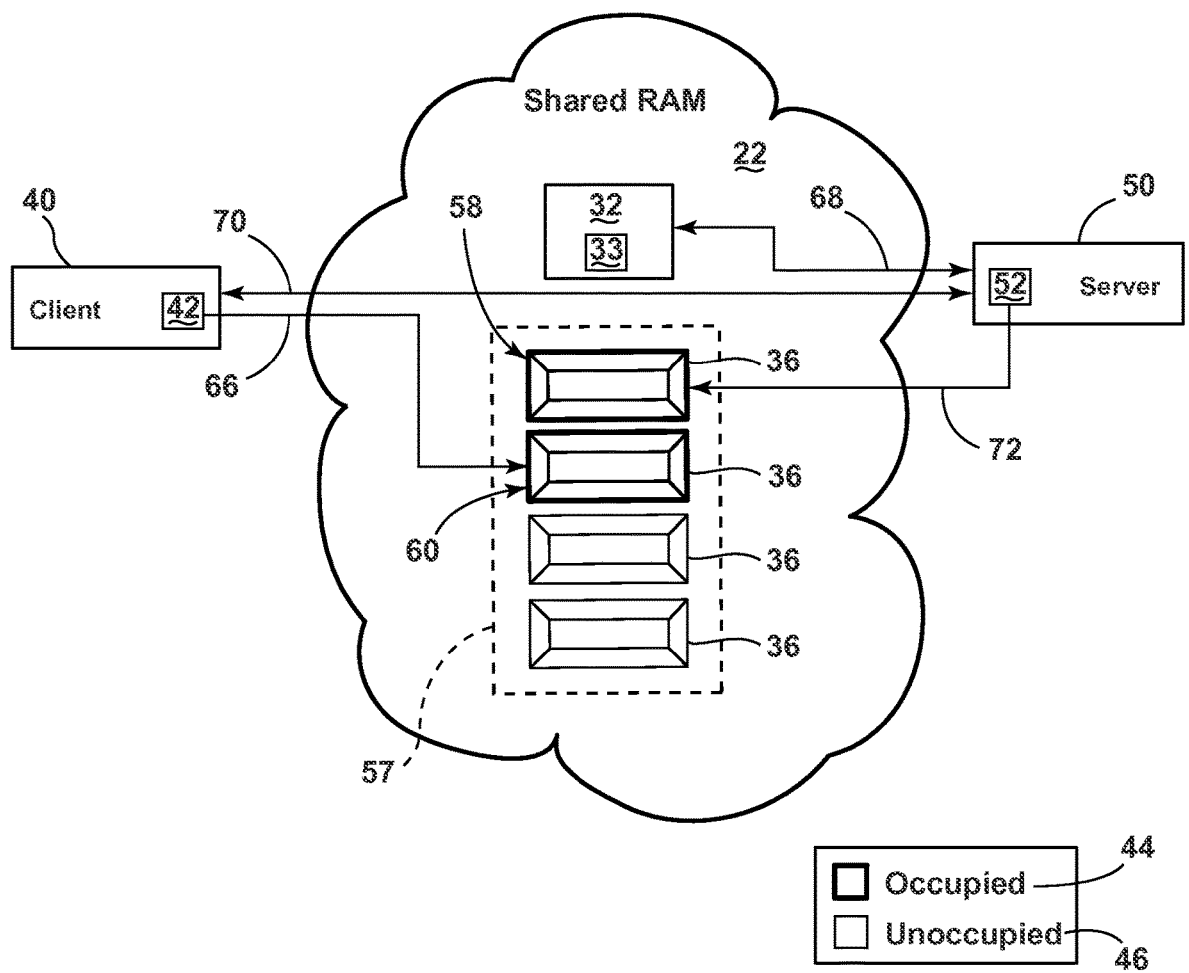
FIG. 6 is a schematic view of a mechanism for clients performing a read/write transaction to data in a buffer, in accordance with one embodiment of the invention.

The mechanism illustrated in FIG. 6 builds on the mechanism shown in FIG. 5. In this example, the client 40 had been executing, for example, a read/write transaction on the first buffer 58, completed the transaction and set the buffer 58, for example, to "request pending" to denote a transaction is required by the server 50, and is now performing a transaction on the second buffer 60.

The server 50 may be performing transactions for a number of clients 40 according to a schedule. For example, the server 50 may be performing transactions for clients based on a round-robin schedule, first in/first out schedule, last in/first out schedule, sequential schedule, quality of service scheduling, timed schedule where each client 40 has a defined time slot to interact with, or combination thereof. Additional algorithms and/or scheduling methods may be included for addressing a number of client 40 transactions.

In the illustrated example, when the server 50 has determined the client 40 is to be serviced, the server 50 may first consult the mailbox 32 and/or the reference list 33 to identify the client 40 (illustrated as communication 68). The server 50 may next consult the client 40 and/or the client's active access pointer 42 to determine if any transactions are required by the server 50 (illustrated as communication 70). If no transactions are required by the server 50, the server 50 may continue to operate according to the schedule or algorithm, and may, for example, move on to the next client 40 to be serviced. However, as described above, the first buffer 58 includes a transaction to be completed by the server 50. The client 40 and/or the active access pointer 42 identifies the first buffer 58 is ready for server 50 control, and may include, for example, the location of the first buffer 58 in the shared memory 22.

The server's active access pointer 52 then points to the identified first buffer 58, and proceeds to provide the transaction requested (illustrated as communication 72). When the server's 50 requested transaction is completed, the server 50 may set the buffer 58, for example, to "response pending" for further transaction, or available (unoccupied) for a new transaction. The server may then decouple communication 72 from the first buffer 58, and may repeat the above-described communications to service additional client 40 buffers 36 as needed, or as according to the schedule. Additionally, embodiments of the invention may include a priority indicator for prioritization of service of particular buffers 36, by the server 50.

Figure 7:
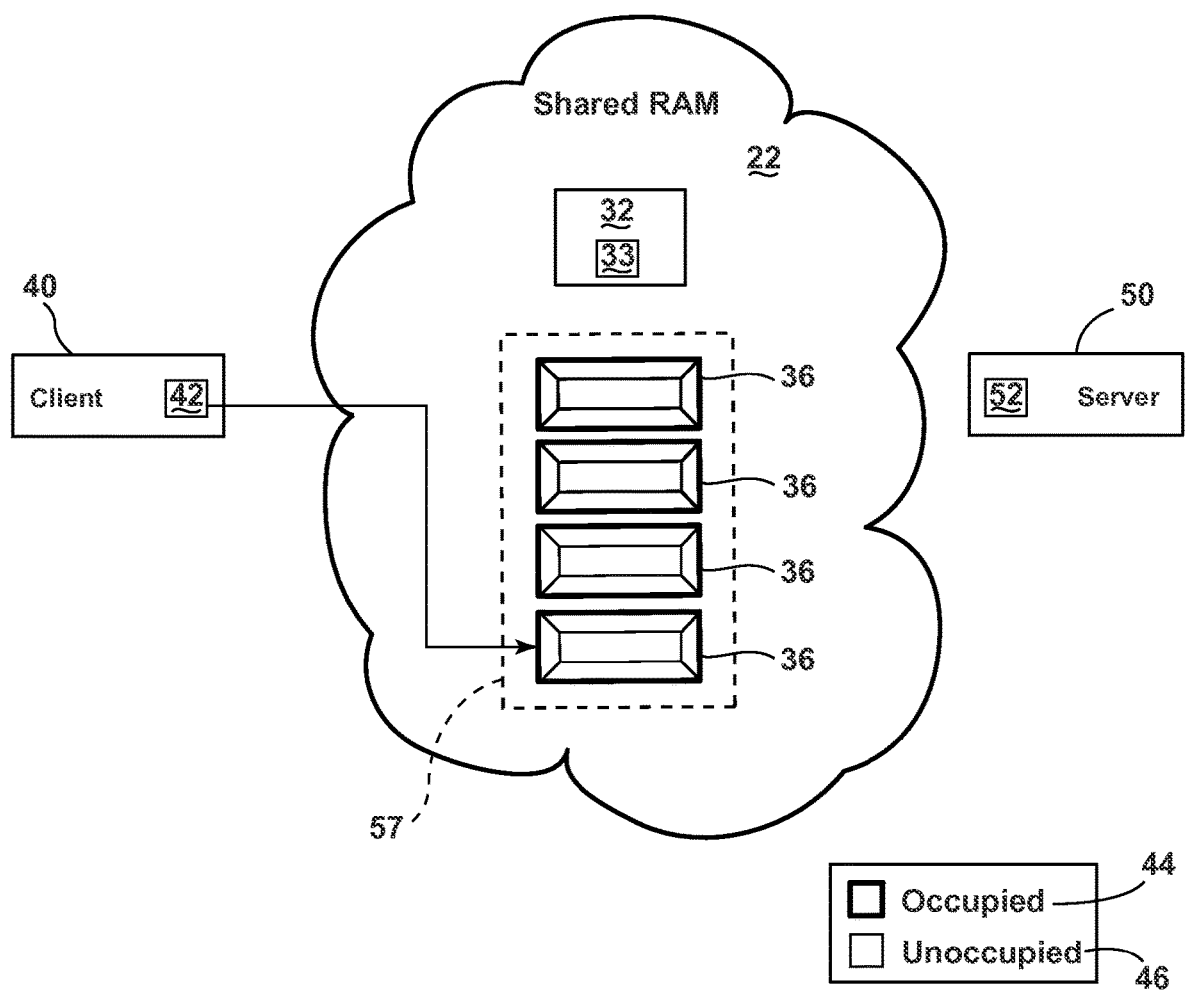
FIG. 7 is a schematic view of a mechanism for directing a client to the safe buffer, in accordance with one embodiment of the invention.

Additionally, while one transaction request for the server 50 is explained, it is understood that a client 40 may be generating transactions that result in a queued plurality of server 50 requests. Regardless of how the server 50 responds to a plurality of server transaction requests, embodiments of the invention may include instances wherein all buffers 36 are occupied while a client 40 or server 50 attempts to request an additional transaction. Such a scenario is illustrated in FIG. 7, wherein there are no available or unoccupied 46 buffers 36. In this instance, the client is in performing a transaction on data within a buffer 36, and all the other buffers 36 are occupied 48, for example, awaiting a server 50 transaction. In this example the mechanism for communicating provides that at least one of the client 40, the active access pointer 42, and/or the current buffer 36 will always respond to the respective transaction request with a failed transaction indication until an additional unoccupied 46 buffer 36 is available. In this sense, when the transaction request fails, the client 40 may again try to perform the requested transaction, which for example, may complete successfully at a later time, if one or more buffers 36 have become unoccupied 46. Thus, the mechanism provides for the number of transactions requested by the client 40, plus one (i.e. an optional "extra buffer" 36) such that even the client 40 will always have the extra buffer 36 for transactions, even if they are uncompleted transactions, until additional buffers 36 are available. In embodiments where no "extra" buffer is provided, clients 40 may not have a buffer 36 to attempt to perform the requested transaction, and no transactions will be performed until one or more buffers 36 become available again.

The above-described mechanisms may operate using only machine assembly language transactions and/or atomic operations without copying the data at design level beyond machine assembly language, such as without copying the data at an operating system level (e.g. "zero copy"). The technical effect of embodiments of the invention, as described above, include that the zero-copy operation is achieved by directing the clients 40 and/or servers 50, using active access pointers 42, 52, to respective buffers 36 including the message data, such that the message data is never "locked" or "blocked" from access by other clients 40 and/or servers 50. Additionally, the use of machine assembly language allows for "atomic swap" operations of the references, wherein the update is completed in a single atomic cycle of operation, and thus cannot be interrupted by other updates to the data and/or buffer, since other updates cannot be completed in a cycle of operation shorter than the atomic swap. In this sense, the swap operations guarantee the switching the reference to a buffer 36 either succeeds or fails absolutely, and thus, there is no potential for corruption of the reference itself, due to, for example interruption of the swap. The mechanism works across client 40 and/or process 26, 28 boundaries and does not rely on disabling interrupts.

By utilizing machine assembly language instructions and basic data structures (e.g. singly-linked lists, basic references), the mechanisms provide for asynchronous inter-process data communications between at least one server 50 and at least one client 40, in a shared memory 22, using a zero-copy data exchange, allowing for "lock-free," or "block-free" access for the accessible data without complex configuration of process priority, or the phenomena of "priority inversion," wherein a pre-accessing lower priority process locks the data and does not "release" it for access even when a higher priority process requests access. In fact, since operations using machine instructions tend toward "first one to the data wins," higher-priority processes may always perform their operations first. Additionally, the mechanisms provide "wait-free" access for the accessible data that can be performed at the process level, not just at the thread level.

Embodiments of the invention may further utilize the above-described mechanisms by providing programming application programmable interfaces (APIs) to access the mechanisms at an operating system level (or application level, etc.) via the APIs. The technical effect is that the above described embodiments provide for the zero-copy method to prevent data locking, data blocking, and/or priority inversion.

The above-described mechanisms are further arranged and configured so that the mailslot 32 is capable of allocating a number of client 40 and/or server 50 transaction requests, even then the number of transaction requests are greater than anticipated or intended, or are generated at a faster rate than the server can respond. Furthermore, the mechanism described may providing a denial-of-service attack, wherein one or more clients attempt to make a machine or network resource unavailable to its intended users by saturating the target server with transaction requests so that it cannot provide the intended service. Denial-of-service attacks may attempt to monopolize server 50, client 40, and/or buffer 36 resources, which may include bandwidth, processing capabilities, or ability to respond to priority transactions, or may obstruct or reduce the intended service, or at worst, causes the target server or resource to fail. However, in any attempted monopolization of a resource of the above-described mechanism, the optional combination of the failed transaction requests of the extra buffer 36, along with the scheduling of the server 50 will prevent such a denial-of-service attack, without the transaction requests may occur without consuming resources, as described above, and without locking or blocking the respective data.

An additional advantage that may be realized in the above embodiments is that the above-described embodiments prevent poor system resource performance that results from data-copying efforts at a non-machine language level. Furthermore, embodiments of the invention reduce the number of copies necessary by utilizing references and buffers, as described above. Another advantage of the above-described embodiments includes a built-in mechanism for overwriting older data in the buffers, and thus, does not require any type of "garbage collection" data management schemes. Furthermore, typical data sharing from a server to one or more clients is accomplished by creating a global data storage and protecting it using semaphores (i.e. access-controlling values such as locked/unlocked indicators) at, for example, an operating system level, any other mutex or locking data protections (e.g. data interrupts, etc.), which may be quite costly in terms of processing time, especially when the data stores are large. This allows for more efficient, and faster, lock-free access operations, as described herein. Furthermore, operating systems don't typically provide semaphore control between processes, only between threads within a process.

Other advantages that may be realized in the above-described embodiments include that the mailslot design has the flexibility to keep the processes loosely coupled, requires little coordination, and does not require a "staged startup" (i.e. processes, client, and/or servers can come online at any time). Additionally, implementation of the above-described APIs may result in reduced development costs for system development, and increased performance margins on similar hardware, compared with different copy methods.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A mechanism for communicating between at least one client and at least one server by accessing message data in a shared memory, comprising:
an allocation of data in the shared memory into at least one mail slot allocated for a particular utilization of data storage, the allocation being accessible by a predetermined constant address, and the at least one client each having their own buffer defining a set of buffers for performing transaction requests, and wherein each of the buffers is controllable by each of the respective client or the server;
the at least one mail slot having references identifying the at least one client and the at least one server;
the at least one client having an active access pointer that enables the at least one client to directly manipulate message data via a client-controlled buffer; and
the at least one server having an active access pointer that enables the at least one server to directly manipulate the message data via a server-controlled buffer;
wherein the active access pointers are allocated among buffers using only atomic operations without copying the data at an operating system level.

2. The mechanism of claim 1 wherein the mechanism is a flight management system.

3. The mechanism of claim 1 wherein the at least one mail slot and the set of buffers are predefined during initialization of the shared memory.

4. The mechanism of claim 1 wherein the transaction request comprises at least one of reading the data, or writing new data to the buffer.

5. The mechanism of claim 4 wherein at least one transaction is allocated to a unidirectional memory space comprising at least an available buffer queue and a request buffer queue.

6. The mechanism of claim 4 wherein at least one transaction is allocated to a bidirectional memory space comprising at least an available buffer queue, a request buffer queue, and a response buffer queue.

7. The mechanism of claim 1 wherein the number of buffers is equal to at least the number of requested transactions by the respective client, plus one extra buffer.

8. A method for communicating between at least one client and one server by accessing message data in a shared memory, the method comprising:
allocating data in the shared memory into at least one mailslot allocated for a particular utilization of data storage;
assigning a single predetermined address to access each at least one mailslot;
allocating a number of buffers for each of the at least one clients, each of the at least one clients having their own buffer, and each buffer being client-controllable and server-controllable, the number of buffers being equal to the number of requested transactions by the respective client; and allocating a client active access pointer from a client-controlled buffer to change control of the client-controlled buffer to a server-controlled buffer enabling the server to directly manipulate the message data via a server active access pointer;
wherein the message data is accessed via active access pointers to the buffers using only atomic operations without copying the message data at an operating system level.

9. The method of claim 8 wherein the allocating the data into at least one mailslot, the assigning a single predetermined address, and the allocating the number of buffers for each at least one client occurs during initialization of the shared memory.

10. The method of claim 8 wherein accessing the message data comprises at least one of reading the data or writing new data to the buffer.

11. The method of claim 10 wherein at least one transaction is performed in a unidirectional memory space comprising at least a state portion and a message data portion, and
wherein at least one of the at least one mailslots comprises at least one variable allocation originating from the single predetermined address.

12. The method of claim 10 wherein at least one transaction is performed in a bidirectional memory space comprising at least an available buffer queue, a request buffer queue, and a response buffer, and
wherein the at least one server is defined by the ARINC 653 standard.

13. The method of claim 8 further comprising initiating a new client transaction request in a respective unoccupied client-controlled buffer.

14. The method of claim 8 wherein the number of buffers is equal to at least the number of requested transactions by the respective client, plus one extra buffer.

15. The method of claim 14 wherein a new client transaction request will fail when all respective client buffers are occupied,
wherein the new client transaction request comprises three transactions, and
wherein four buffers are provided.

16. The method of claim 8, wherein said at least one mailslot comprises a reference list identifying the at least one client and the at least one server; and
wherein when the at least one server has determined a first client is to be serviced, the at least one server first consults one of said mailslot and said reference list to identify a first client to be serviced, the method further comprising:
arraying the mailslots in a sequential fashion originating from the single predetermined address.

17. The method of claim 16 wherein after the at least one server identifies a first client to be serviced, the at least one server consults one of said first client and the active access pointer of the first client to determine if any transactions are required by the at least one server, the method further comprising:
arraying the mailslots in a singly-linked list.

18. The method of claim 17 wherein if a transaction is required by the at least one server;
the at least one server establishes communication with a first buffer of the number of buffers; the at least one server provides the transaction; and
the at least one server decouples communication with the first buffer of the number of buffers; wherein the first buffer of the number of buffers has been allocated to said first client, and
wherein the at least one server identifies a second client to be serviced; wherein the at least one server uses a priority indicator to determine which client to service first.

19. The method of claim 18 wherein the at least one server performs transactions according to a first in/first out schedule, and wherein the priority indicator determines that the client of the first client and the second client with the higher-priority request is serviced first, even when the client with the higher-priority request is not the first in.

20. A mechanism for communicating between more than one client and at least one server by accessing message data in a shared memory, the mechanism comprising:

a shared memory;

an allocation of data in the shared memory into at least one mailslot allocated for a particular utilization of data storage, the allocation being accessible by a predetermined constant address, and a set of buffers for each of the more than one client for performing transaction requests, each of the more than one client having their own buffer of the set of buffers, and wherein both of the respective more than one client and the at least one server is enabled to execute read/write transactions on said set of buffers;

the at least one mailslot having references identifying the each of more than one client and the at least one server;

the more than one client having an active access pointer that enables the more than one client to directly manipulate message data via a client-controlled buffer; and the at least one server having an active access pointer that enables the at least one server to directly manipulate the message data via a server-controlled buffer;

wherein the active access pointer is allocated among buffers using only atomic operations without copying the data at an operating system level; and wherein said shared memory is accessible by each of the more than one clients.

* * * * *